United States Patent [19]

Shaver

[11] 4,108,150
[45] Aug. 22, 1978

[54] AGITATOR FOR AN AXIAL FLOW CYLINDER

[75] Inventor: J. Lyle Shaver, Blue Springs, Mo.

[73] Assignee: Allis-Chalmers Corporation, Milwaukee, Wis.

[21] Appl. No.: 780,532

[22] Filed: Mar. 23, 1977

[51] Int. Cl.$^2$ ............................................. A01D 41/12
[52] U.S. Cl. ................................. 130/27 H; 56/14.6; 130/27 T
[58] Field of Search ................ 56/14.5, 14.6, 122–125; 130/27 R, 27 H, 27 HA, 27 Q, 27 T

[56] References Cited

U.S. PATENT DOCUMENTS

| | | | |
|---|---|---|---|
| 2,811,158 | 10/1957 | Rietmann | 130/27 Q |
| 3,306,302 | 2/1967 | Mark et al. | 130/27 H |
| 3,430,633 | 3/1969 | Mark | 130/27 R |

*Primary Examiner*—Russell R. Kinsey
*Attorney, Agent, or Firm*—Charles l. Schwab

[57] ABSTRACT

A cylinder cage of an axial flow combine has radial openings about its circumference permitting threshed material to leave the cage as the threshing cylinder is rotated. An agitator mechanism is provided to dislodge threshed material tending to accumulate on the top side of the cylinder cage. Once dislodged, the threshed material will fall to a distribution aguer which in turn delivers the threshed material to accelerator rolls disposed beneath the threshing cylinder and cylinder cage. The agitator includes a plurality of curved ribs or fingers spaced axially along and adjacent the outer periphery of the cylinder cage. The agitator fingers are rigidly secured to a backbone member, which in turn is supported on the main frame of the combine by a pair of parallel links. An oscillating device is connected to one of the parallel links causing it to swing horizontally back and forth which in turn effects oscillating movement of the agitator in the axial direction of the cylinder cage.

8 Claims, 8 Drawing Figures

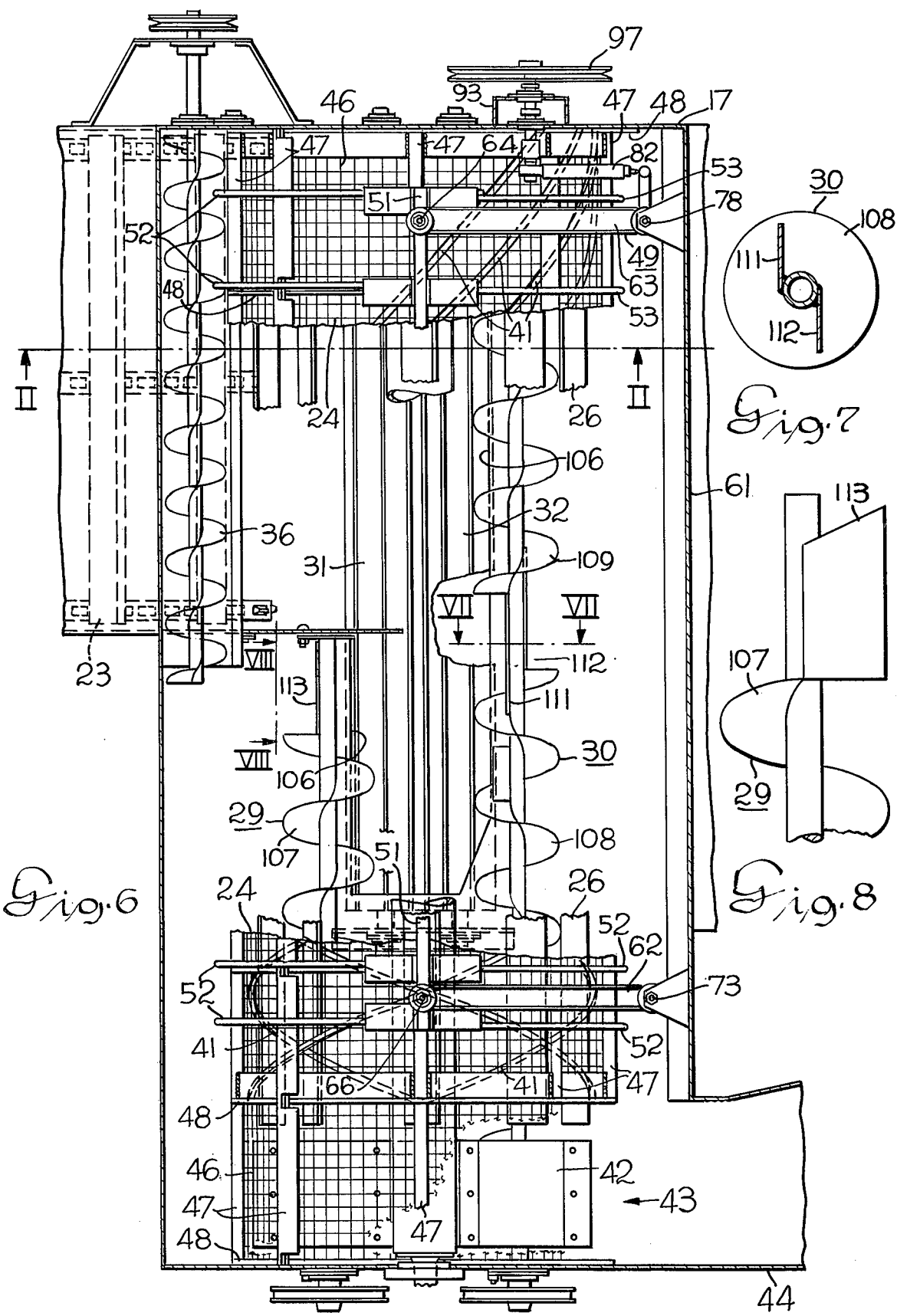

AGITATOR FOR AN AXIAL FLOW CYLINDER

CROSS REFERENCE TO RELATED APPLICATIONS

The present invention is useful in axial flow combines such as shown in U.S. patent applications Ser. No. 592,713, filed July 3, 1975, on a Grain Accelerator Precleaner and Ser. No. 713,536, filed Aug. 11, 1976, for Combine with Means for Reducing the Bounce of Accelerated Grain.

BRIEF DESCRIPTION OF THE INVENTION

In order to utilize the full periphery of a screen or sieve-like cylinder cage for discharge of threshed material from the cylinder of an axial flow combine, an agitator mechanism is employed to dislodge the threshed material from the upper outer periphery of the cylinder cage. The agitator mechanism includes a backbone from which is suspended a plurality of axially spaced, curved fingers adjacent to the outer periphery of the cylindrical cage. The backbone is suspended from a pair of horizontally disposed parallel links, one of which is connected to an eccentric drive whereby an axial oscillating motion is imparted to the agitator.

It is a primary object of the present invention to provide means for removing buildup of straw or the like from the upper periphery of a screen-like cage surrounding an axial flow threshing cylinder thereby increasing separating threshing capacity.

BRIEF DESCRIPTION OF THE DRAWINGS

One embodiment of the present invention is illustrated in the drawings wherein:

FIG. 6 is a top view of the combine shown in FIG. 1 with parts broken away to the present invention and its relation to other components;

FIG. 7 is a section view taken along the line VII—VII; and

FIG. 8 is a section view taken along the line VIII—VIII.

DETAILED DESCRIPTION OF THE DRAWINGS

Figure 1:
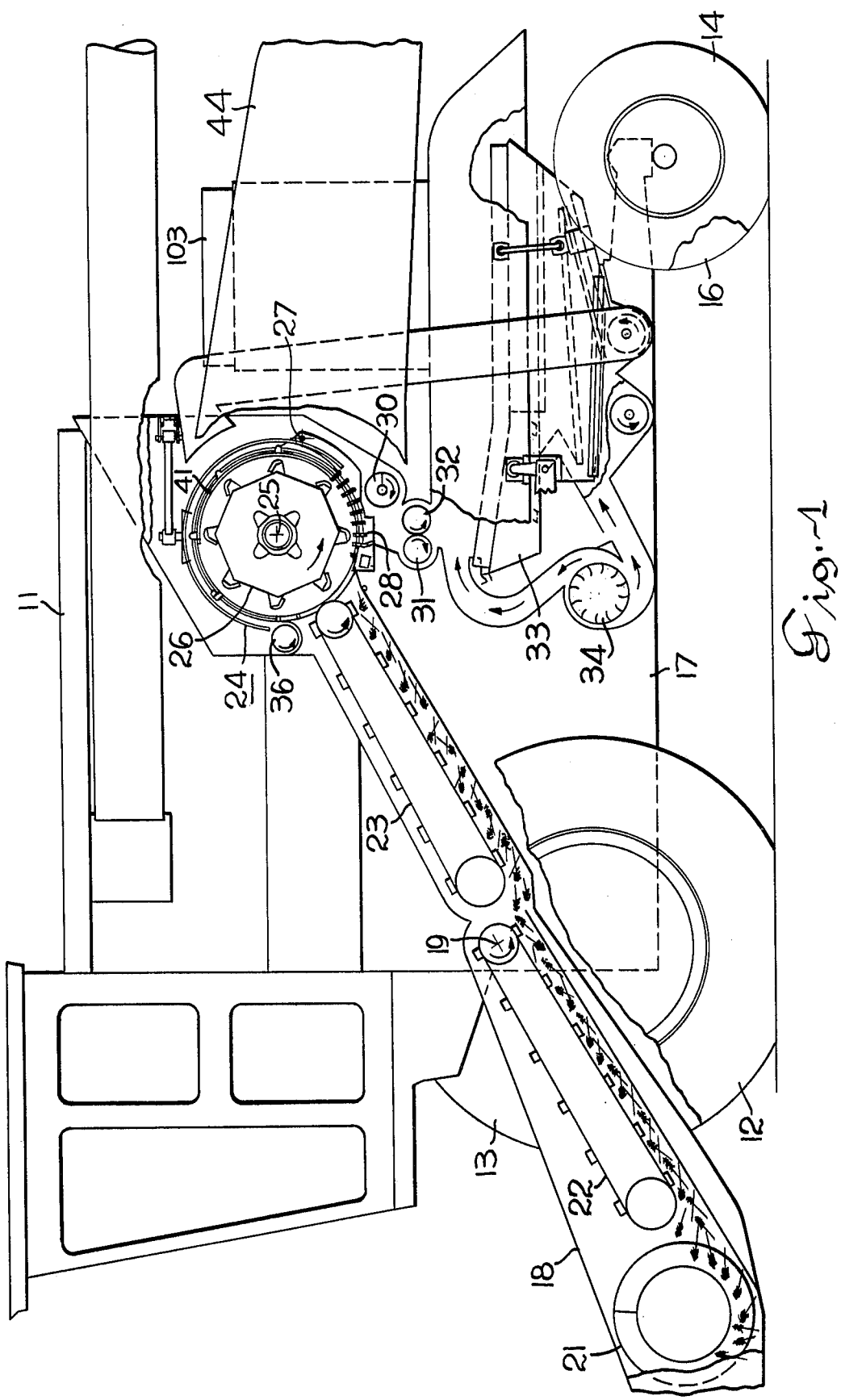
FIG. 1 is a side view of an axial flow combine with parts shown schematically and with parts broken away for illustration purposes.

Referring to FIG. 1, the combine 11, in which the present invention is illustrated, includes a pair of front drive wheels 12, 13 and a pair of steerable rear wheels 14, 16 supporting a main frame 17. A header 18 is pivotally connected to the main frame 17 on a transverse axis 19 for vertical adjustment of the cutting height. An auger 21 with oppositely pitched flights moves the cut grain inwardly from the transversely outward extending ends of the header to a central location where a first slat feeder 22 moves the cut stalks upwardly and rearwardly to a second slat feeder 23. The second slat feeder 23 in turn moves the cut stalks to an opening in a threshing cage 24 in which a threshing cylinder 26 is disposed.

Figure 2:
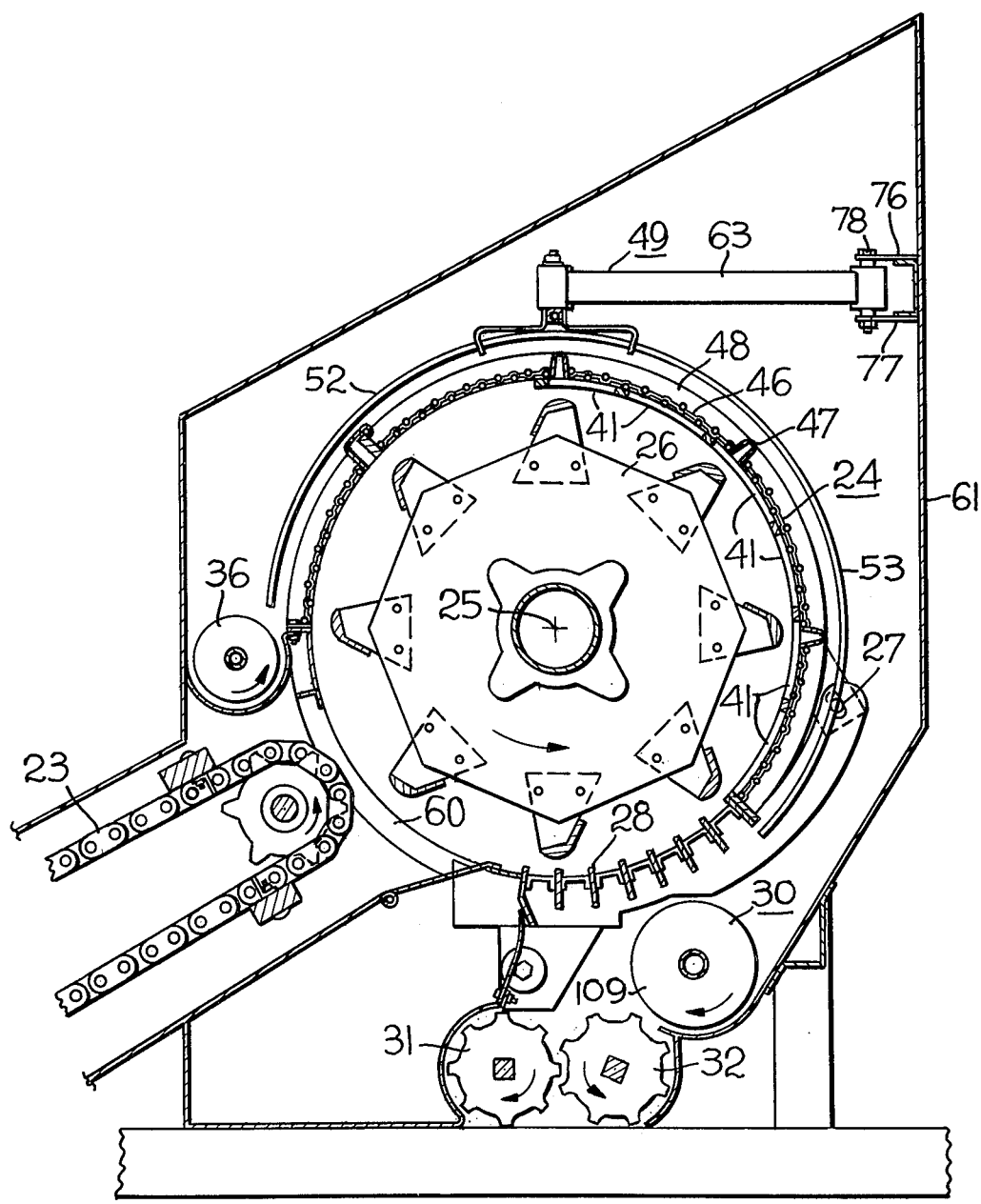
FIG. 2 is an enlarged section view taken along the line II—II in FIG. 6.

Referring also to FIGS. 2 and 6, the threshing cylinder 26 is mounted on the side walls of the main frame 17 for rotation about a transverse axis 25. The cylinder cage 24, which is essentially a cylindrical screen or sieve, includes a concave 28 pivoted on a transverse axis 27. Threshed material passing through the peripheral openings of the cage 24 or downwardly through the concave 28, is guided by distribution augers 29, 30 and an overfeed auger 36 to a pair of accelerator rolls 31, 32 which accelerate threshed material downwardly toward a grain pan 33 through a layer of horizontally directed air supplied by a blower 34. The function of the accelerator rolls is fully described in my copending patent application Ser. No. 592,713 filed July 2, 1975 for a Grain Accelerator Precleaner. The straw which stays within the cage 24 is moved axially by helical ribs 41 on the inside of the cage to a discharge beater 42 on the cylinder 26 adjacent a discharge opening 43 at the rear side of one axial end of the cage. The beater 42 discharges the straw from the cage and an additional rearwardly positioned discharge beater (not shown) induces movement of the straw rearwardly through a straw discharge chute 44.

As shown in FIGS. 2 and 6, the cylindrical cylinder cage 24 surrounding the threshing cylinder 26 is fabricated from a woven wire screen 46 secured to longitudinal frame members 47 and annular flanges 48. Heretofore, it has not been believed practical to provide openings in the upper part of the cylinder cage for an axial flow cylinder because of the inherent buildup of straw on the upper exterior of the cylinder cage, thereby preventing egress of threshed material from the upper part of the cage. In order to alleviate or prevent buildup of threshed material or stalk segments on the top outside of the cylinder cage, I provide an agitator mechanism 49 which is illustrated in detail in FIGS. 3, 4 and 5. The agitator mechanism 49 includes a plurality of ribs or fingers 52, 53 suspended from a backbone member 51. Fingers 52 arc about 105°, whereas fingers 53 arc about 160°. The fingers are secured to the backbone member 51 by a pair of clips 56, 57 which are bolted to the backbone member 51 by bolts 58 and nuts 59. Four long fingers 53 and four short fingers 52 are joined together by clips 56, 57 to form four finger assemblies extending in an arc of about 225°, as shown in FIG. 4. These four assemblies are in confronting relation to the outer periphery of the axial end section of the cage having the concave 28 and the inlet 60 for the material conveyed by conveyor 23. The remainder of the agitator has finger assemblies comprised of a pair of fingers 52 held together by clips 56, 57 which extend in an arc of about 180°, as shown in FIG. 5. The opposite ends of the backbone member 51 are supported on a transverse wall 61 of the combine main frame 17 by a pair of parallel links 62, 63 having corresponding forward ends pivotally connected to the backbone member by vertical pivot pins 64, 66. The rear end of the link 62, is mounted on vertically spaced brackets 71, 72 on the wall 61 by a vertical pivot pin 73 and the rear end of the link 63 is mounted on vertically spaced brackets 76, 77 on the wall 61 by a vertical pivot pin 78.

Figure 3:
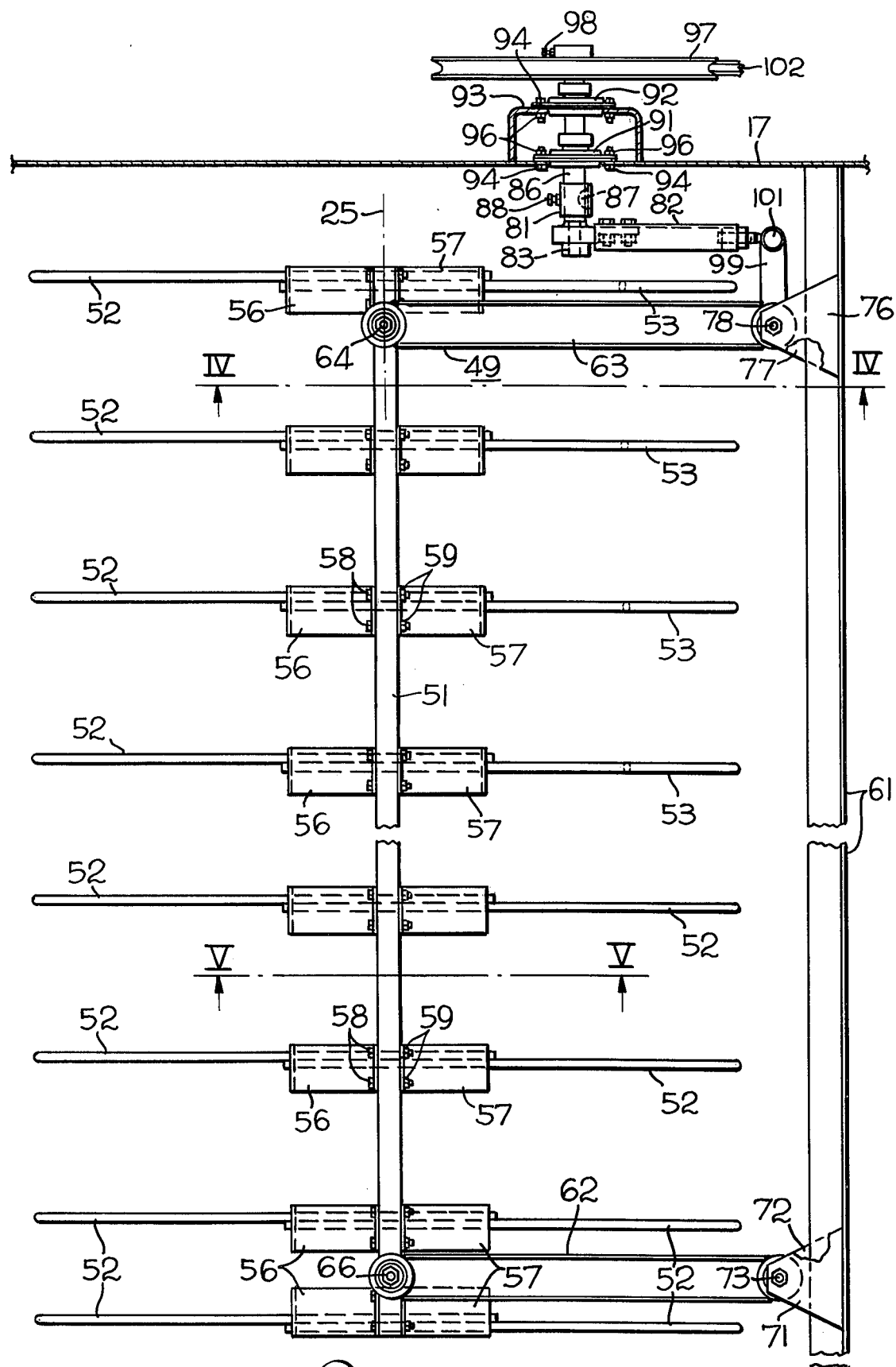
FIG. 3 is an enlarged top view of the agitator mechanism shown in FIG. 2.
Figure 4:
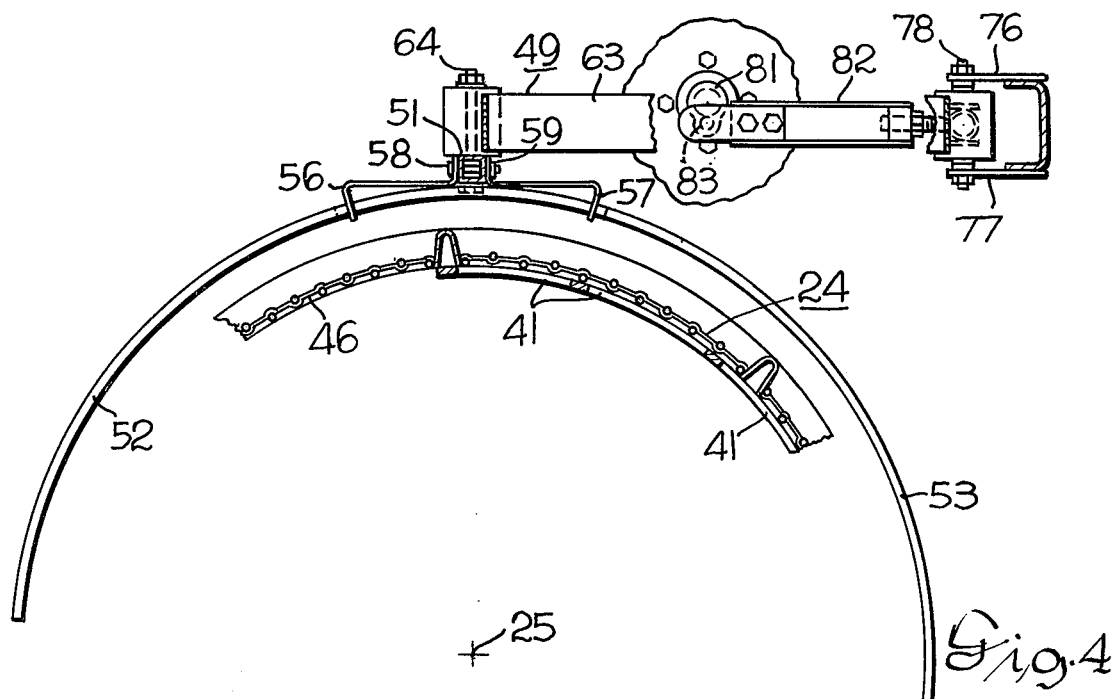
FIG. 4 is a section view taken along the line IV—IV in FIG. 3.
Figure 5:
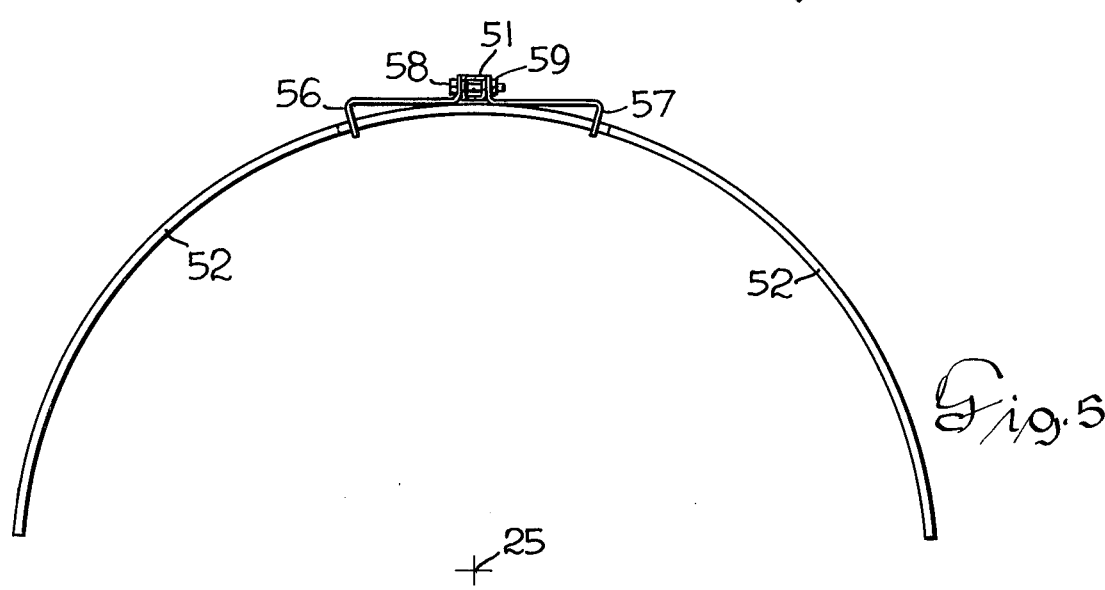
FIG. 5 is a section view taken along the line V—V in FIG. 3.

Referring to FIGS. 3 and 4, the agitator mechanism 49 includes oscillator means in the form of a rotating eccentric 81 and a connecting rod 82 which is pivotally connected to a crankshaft 83 of the eccentric 81. The eccentric is connected to the inner end of a shaft 86 by a key 87 and a set screw 88. The shaft is journaled in bearing assemblies 91, 92 releasably secured to the side wall 17 and extension wall 93 by suitable fastening means such as the illustrated bolts 94 and nuts 96 and a belt pulley 97 is secured to the outer end of the shaft 86 by a set screw 98. The rear end of the connecting rod 82 is connected to a laterally extending arm 99 of the link 63 by a ball and socket joint 101.

During a harvesting operation with the combine, the pulley 97 will be driven by appropriate power transmitting means including a V-belt 102 which is connected to the engine 103 by means not shown. As the pulley 97 and the shaft 86 rotate, the crankshaft 83 of the eccentric 81 moves in a circular path or orbit thereby imparting linear motion to the connecting rod 82. The connecting rod 82 imparts a reciprocating motion to the outer end of the arm 99 which in turn causes an oscillating movement of the agitator 49 in the direction of the axis 25 of the threshing cylinder, which is also the axis of the cylinder cage 24. Such agitation causes the fingers 52, 53 to encounter straw which has not fallen free from the cage or which has partially or fully passed through the radial openings in the cage but resides on the top or outer surface thereof. In other words, the fingers 52, 53 will agitate and loosen the excess accumulation of straw and the like on the top and fore and aft sides of the cage so that the air flow created by the threshing cylinder 26 will dislodge the excess material from the cage and it will fall to the distribution augers 29, 30 and the overfeed auger 36. The augers 29, 30, 36 move the material to the transversely extending, elongated opening 106 disposed above the accelerator rolls 31, 32. In addition to the spiral auger flights 107, 108, 109, the augers 29, 30 include flat, radial paddles 111, 112 and 113, as shown in FIGS. 6, 7, 8, which help to evenly distribute the threshed material to the opening 106, through which it falls to the accelerator rolls 31, 32.

The agitator mechanism 49 of this invention facilitates movement of threshed material through the radial openings in the top and sides of the cage, thus increasing the threshing capacity of the combine. Without the use of an agitator, straw accumulates on the upper part of the cage resulting in plugging or blocking of the radial openings therein. The plugging or blocking, which would otherwise occur, would reduce the efficiency of the threshing and separating operation to such an extent that the speed of combine travel would need to be reduced so as to cause the material flow to correspond to the reduced capacity of the threshing cylinder and cage.

The embodiments of the invention in which an exclusive property or privilege is claimed are defined as follows:

1. In a combine the combination comprising:
    a frame;
    a horizontally disposed threshing cylinder mounted on said frame for rotation about an axis,
    a cylindrical cage secured to said frame in surrounding relation to said threshing cylinder having radial openings circumferentially thereabout permitting egress of threshed material,
    means causing axial flow of material from one axial end of said cage to the other as said threshing cylinder is rotated, and
    an agitator mechanism including spaced mechanical fingers adjacent the top exterior of said cage and drive means oscillating said fingers to disturb accumulation of material on the top side of said cage.

2. The combination of claim 1 wherein said fingers are spaced axially in the direction of said axis.

3. The combination of claim 2 wherein said fingers are arcuate.

4. The combination of claim 3 wherein said agitator mechanism includes a backbone member to which said fingers are secured.

5. The combination of claim 4 wherein said backbone member is disposed above said cage and extends axially in a generally parallel relation to said axis.

6. The combination of claim 5 wherein said fingers extend arcuately in opposite directions from said backbone member.

7. The combination of claim 6 wherein some of said fingers extend in an arc exceeding 90°.

8. The combination of claim 6 wherein said agitator mechanism includes parallel support links connecting said backbone member to said frame and said drive means is connected to one of said links and is operable to oscillate said backbone axially in relation to said cylindrical cage.

* * * * *